Patented Oct. 7, 1952

2,613,142

UNITED STATES PATENT OFFICE 2,613,142

ALCOHOL FUEL GEL

Sol B. Wiczer, Washington, D. C.

No Drawing. Application May 11, 1948,
Serial No. 26,470

6 Claims. (Cl. 44—7)

The present invention relates to a solidified gel fuel using methyl cellulose as the gelating agent and a polar type organic liquid such as alcohol as the combustible liquid.

Methyl cellulose has great advantages for this purpose in that it forms a true gel of any desired viscosity merely by cold admixture with the alcohol in quantity sufficient to give the desired viscosity. The methyl cellulose has the further advantage that a stable gel is produced exhibiting no syneresis over considerable periods of time.

Commercial methyl cellulose varies in the degree of methylation ranging from 1 to 3 methyl ether radicals per glucoside linkage. The practical difference for purposes herein is that the lower methylation products require a greater quantity to obtain the same gel viscosity. Useful gels are possible using from 3 to 50% of methyl cellulose having 1 to 3 methyl groups per glucoside linkage determined as weight percent of the final fuel composition. Using methyl, ethyl or iso propyl alcohols as 70 to 90% commercial alcohol (balance water, denaturant corrosion inhibitor, coloring matter etc.), it is preferred to use 5 to 20% of 4000 cps. methyl cellulose.

In order to improve the polarity and solubility of the solvent for the methyl cellulose, only polar solvents such as commercial alcohols usually containing 5 to 35% of water are used. Such polar solvent may also contain minor quantities not over 25% of non polar solvents such as benzol or gasoline.

Example I

One pound of (Dow) 4000 cps. methyl cellulose is agitated at room temperature with 1½ gals. of 80% ethyl alcohol. A smooth gel is obtained which will maintain its shape but will flow under pressure. The gel is stable and burns with a continuous flame leaving a small charred residue. It does not melt during combustion.

Example II

One pound 4000 cps. methyl cellulose is agitated with 1 gallon of 80% ethyl alcohol. The product gels immediately and is considerably thicker than the product of Example I.

Example III

Example I is repeated by substituting 70% iso propyl alcohol. The product appears substantially the same but burns with a hotter flame.

Example IV

Example I is repeated substituting 90% methyl alcohol. A medium viscosity gel similarly combustible is obtained.

In the above examples if the methyl cellulose has not been finely shredded it may require excessive agitation to remove lumps. In such case the methyl cellulose is first kneaded with only a portion of the solvent until the lumps are broken up in a thick paste, the balance of liquid being subsequently added with agitation until the gel is thinned to desired viscosity.

In an alternative method, the methyl cellulose is first wet with relatively dry alcohol and then mixed with small quantities of water or aqueous alcohol to obtain the final 70 to 90% alcohol used.

Use of lower temperatures during agitation will tend to reduce inclusion of air bubbles which makes the product opaque. For this purpose the gel may be formed by stirring at —5° C.

Example V

One pound of methyl cellulose is agitated with 1 gallon of liquid consisting of 10% benzol, 80% methanol and 10% water by volume to obtain a solid fuel gel.

Various conventional additives for alcohol and fuel gels may be used such as dyes, denaturants, and oxidizing agents such as sodium nitrate without departing from the spirit of the present invention.

I claim:

1. A combustible gel comprising a volatile combustible liquid and a gelating agent therefor, said combustible liquid being composed of at least 75% of commercial alcohol having 1-3 carbon atoms, said commercial alcohol consisting of at least 70% of alcohol, the balance of said commercial alcohol being substantially water, said combustible liquid being gelled with 3-50% by weight thereof of methyl cellulose.

2. A combustible gel comprising a volatile combustible liquid and a gelating agent therefor, said combustible liquid being composed of at least 75% of commercial alcohol having 1-3 carbon atoms, said commercial alcohol consisting of at least 70% of alcohol, the balance of said commercial alcohol being substantially water, said combustible liquid being gelled with 5-20% by weight thereof of methyl cellulose.

3. A combustible gel comprising a volatile combustible liquid and a gelating agent therefor, said combustible liquid being composed of at least 75% of commercial methanol, said commercial methanol consisting of at least 70% of methanol, the balance of said commercial methanol being substantially water and normal commercial methanol impurities, said combustible liquid being gelled with 5–20% by weight thereof of methyl cellulose.

4. A combustible gel comprising a volatile combustible liquid and a gelating agent, said combustible liquid being composed of at least 75% of commercial ethanol, said commercial ethanol consisting of at least 70% of ethanol, the balance of said commercial ethanol being substantially water, said combustible liquid being gelled with 5–20% by weight thereof of methyl cellulose.

5. A combustible gel comprising a volatile combustible liquid and gelating agent therefor, said combustible liquid being composed of at least 75% of commercial isopropyl alcohol, said commercial isopropyl alcohol consisting of at least 70% of isopropyl alcohol, the balance of said commercial isopropyl being substantially water and normal commercial isopropyl alcohol impurities, said combustible liquid being gelled with 5–20% by weight thereof of methyl cellulose.

6. A combustible gel comprising a volatile combustible liquid and a gelating agent therefor, said combustible liquid being composed of 70–90% of an alcohol having 1–3 carbon atoms and 0–25% of a volatile combustible hydrocarbon liquid selected from the group consisting of gasoline and benzol, the balance of said liquid to 100% being substantially water, said combustible liquid being gelled with 3–50% by weight thereof of methyl cellulose.

SOL B. WICZER.

REFERENCES CITED

The following references are of record in the file of this patent:

UNITED STATES PATENTS

| Number | Name | Date |
|---|---|---|
| 2,046,101 | York | June 30, 1936 |
| 2,102,005 | Jones et al. | Dec. 14, 1937 |

FOREIGN PATENTS

| Number | Country | Date |
|---|---|---|
| 860,470 | France | June 27, 1939 |

OTHER REFERENCES

Draeger et al.: Journal American Medical Asso., Aug. 11, 1945, p. 1097.

"Methocel," copyright 1948–1949, The Dow Chemical Co., pgs. 2 and 5.

"Ethocel Handbook," Dow Chemical Co., 1940, p. 13.